United States Patent
Yamazaki et al.

(10) Patent No.: US 10,150,881 B2
(45) Date of Patent: Dec. 11, 2018

(54) AQUEOUS INKJET INK SET FOR TEXTILE PRINTING AND METHOD FOR PRODUCING PRINTED TEXTILE ITEM

(71) Applicant: RISO KAGAKU CORPORATION, Tokyo (JP)

(72) Inventors: Takahisa Yamazaki, Ibaraki (JP); Yuki Urano, Ibaraki (JP); Hideki Imanishi, Ibaraki (JP); Shunsuke Uozumi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/661,111

(22) Filed: Jul. 27, 2017

(65) Prior Publication Data

US 2018/0030301 A1    Feb. 1, 2018

(30) Foreign Application Priority Data

Jul. 29, 2016  (JP) .................................. 2016-149555
Jul. 25, 2017  (JP) .................................. 2017-143414

(51) Int. Cl.

| | | |
|---|---|---|
| *C09D 11/40* | (2014.01) | |
| *C09D 11/102* | (2014.01) | |
| *C09D 11/322* | (2014.01) | |
| *C09D 11/107* | (2014.01) | |
| *D06P 1/673* | (2006.01) | |
| *D06P 5/20* | (2006.01) | |
| *D06P 5/30* | (2006.01) | |
| *B41J 11/00* | (2006.01) | |
| *B41J 3/407* | (2006.01) | |
| *D06P 1/52* | (2006.01) | |

(52) U.S. Cl.
CPC ............. *C09D 11/40* (2013.01); *B41J 3/4078* (2013.01); *B41J 11/002* (2013.01); *C09D 11/102* (2013.01); *C09D 11/107* (2013.01); *C09D 11/322* (2013.01); *D06P 1/673* (2013.01); *D06P 5/2077* (2013.01); *D06P 5/30* (2013.01); *D06P 1/5257* (2013.01); *D06P 1/5285* (2013.01)

(58) Field of Classification Search
CPC ..... C09D 11/40; C09D 11/102; C09D 11/107; C09D 11/322; B41J 3/4078; D06P 1/5257; D06P 1/5285; D06P 1/673; D06P 5/2077; D06P 5/30
See application file for complete search history.

(56) References Cited

U.S. PATENT DOCUMENTS

| | | | |
|---|---|---|---|
| 2008/0165237 A1* | 7/2008 | Yamauchi | B41J 11/002 347/102 |
| 2010/0196604 A1* | 8/2010 | Kariya | C09D 11/322 427/288 |
| 2012/0306976 A1* | 12/2012 | Kitagawa | C09D 11/326 347/100 |
| 2013/0135382 A1* | 5/2013 | Mitsuzawa | C09D 11/40 347/20 |
| 2013/0176369 A1* | 7/2013 | Gotou | B41J 2/2107 347/100 |
| 2015/0025179 A1* | 1/2015 | Landa | C08K 5/18 524/88 |
| 2017/0058456 A1* | 3/2017 | Loccufier | B41M 5/5218 |
| 2018/0001669 A1* | 1/2018 | Furukawa | B41J 11/002 |

FOREIGN PATENT DOCUMENTS

JP    2013-194122 A    9/2013

* cited by examiner

*Primary Examiner* — Geoffrey S Mruk
*Assistant Examiner* — Scott A Richmond
(74) *Attorney, Agent, or Firm* — Greenblum & Bernstein, P.L.C.

(57) ABSTRACT

An aqueous inkjet ink set for textile printing is disclosed, the aqueous inkjet ink set including a first ink containing a water-dispersible resin having a glass transition point of less than −5° C., a coloring material and water, and a second ink containing a water-dispersible resin having a glass transition point of from −5° C. to 35° C., a coloring material and water. A method for producing a printed textile item is also disclosed.

12 Claims, No Drawings

AQUEOUS INKJET INK SET FOR TEXTILE PRINTING AND METHOD FOR PRODUCING PRINTED TEXTILE ITEM

CROSS REFERENCE TO RELATED APPLICATIONS

This application is based upon and claims the benefit of priority from prior Japanese Patent Application No. 2016-149555 filed on Jul. 29, 2016 and the prior Japanese Patent Application No. 2017-143414 filed on Jul. 25, 2017, the entire contents of which are incorporated by reference herein.

BACKGROUND OF THE INVENTION

Field of the Invention

The disclosure relates to an aqueous inkjet ink set for textile printing, and a method for producing a printed textile item.

Description of the Related Art

Among methods for printing images such as text, pictures or designs onto textiles or the like such as woven fabric and nonwoven fabric, in addition to screen printing methods and roller textile printing methods, inkjet textile printing methods which enable image processing to be performed by computer and textile printing to be performed in a substantially plateless manner are recently attracting considerable attention.

When a textile inkjet printing method is used to print to a substrate such as a dark colored fabric or the like, in order to enhance the color development of the colored ink, a method is used wherein a white ink is first printed onto the dark colored substrate, and the color ink is then printed on the white ink.

JP 2013-194122 A aims to provide an ink set with which, when inkjet textile printing is conducted to print a white ink and a non-white ink are printed on a target recording medium in such a manner that the non-white ink is overprinted on the white ink, it is possible to prevent cracking of the non-white ink image, and discloses the use, at least in the non-white ink, of at least one of an acrylic resin or an urethane resin each of which has a glass transition point (Tg) of −10° C. or lower, a breaking elongation of from 200% to 500% and an elastic modulus of from 20 MPa to 400 MPa.

SUMMARY OF THE INVENTION

According to an aspect of the present invention, an aqueous inkjet ink set for textile printing is provided, the aqueous inkjet ink set including a first ink containing a water-dispersible resin having a glass transition point of less than −5° C., a coloring material and water, and a second ink containing a water-dispersible resin having a glass transition point of from −5° C. to 35° C., a coloring material and water.

According to another aspect of the present invention, a method for producing a printed textile item using the above aqueous inkjet ink set for textile printing is provided, the method including applying the first ink to a substrate using an inkjet recording method, and applying the second ink, using an inkjet recording method, to at least a portion of the region of the substrate to which the first ink has been applied.

DETAILED DESCRIPTION OF THE EMBODIMENTS

JP 2013-194122 A discloses the use of a resin having a glass transition point of −10° C. or lower. However, when the glass transition point of the resin contained in an ink is low, the scratch resistance of images of that ink may be more likely to be unsatisfactory.

Accordingly, an object of the disclosure is to provide an aqueous inkjet ink set for textile printing with which, when two or more inks are printed in such a manner that one ink is printed and another ink is printed thereon, using a textile inkjet printing method, it is possible to form an image that exhibits excellent scratch resistance and cracking resistance for the ink image of the upper layer, and excellent fixation of the ink of the lower layer to the substrate, and also to provide a method for producing a printed textile item.

Embodiments of the present invention are described below, but the present invention is in no way limited by the following embodiments.

[Aqueous Inkjet Ink Set for Textile Printing]

The aqueous inkjet ink set for textile printing (hereafter sometimes referred to as "the ink set") according to embodiments of the invention includes a first ink containing a water-dispersible resin having a glass transition point of less than −5° C., a coloring material and water, and a second ink containing a water-dispersible resin having a glass transition point of −5° C. to 35° C., a coloring material and water.

The first ink and the second ink are described below.

[First Ink and Second Ink]

The components contained in the first ink and the second ink are described below.

<Water-Dispersible Resin>

In embodiments, the first ink preferably contains a water-dispersible resin having a glass transition point of less than −5° C. In embodiments, the second ink preferably contains a water-dispersible resin having a glass transition point of from −5° C. to 35° C.

A "water-dispersible resin" is a resin which does not dissolve in water, but rather exists in a state in which the insoluble resin is dispersed in water in particulate form.

In embodiments, there are no particular limitations on the particle sizes of the water-dispersible resin having a glass transition point of less than −5° C. contained in the first ink and the water-dispersible resin having a glass transition point of from −5° C. to 35° C. contained in the second ink, but from the viewpoint of the inkjet dischargeability, each of the particle sizes is, independently, preferably not more than 300 nm, more preferably not more than 200 nm, and even more preferably 150 nm or less. For example, the particle size may be within a range from 30 nm to 300 nm.

In embodiments, the first ink preferably contains a water-dispersible resin having a glass transition point of less than −5° C.

When the glass transition point of the water-dispersible resin contained in the first ink is less than −5° C., the flexibility of the coating film of the first ink can be improved. Consequently, when the first ink is applied to a substrate, the first ink is able to form a coating film having excellent flexibility and excellent conformability to the substrate, enabling an improvement in the fixation of the first ink to the substrate.

The glass transition point of the water-dispersible resin contained in the first ink is more preferably −10° C. or lower, even more preferably −15° C. or lower, and further preferably −20° C. or lower. The glass transition point of the water-dispersible resin contained in the first ink may, for example, be at least −50° C. but less than −5° C.

In embodiments, the second ink preferably contains a water-dispersible resin having a glass transition point of from −5° C. to 35° C.

When the glass transition point of the water-dispersible resin contained in the second ink is −5° C. or higher, the hardness of the coating film of the second ink can be improved. Consequently, when the second ink is printed as an upper layer, the scratch resistance of the ink image of the upper layer can be improved.

The glass transition point of the water-dispersible resin contained in the second ink is more preferably 0° C. or higher.

When the glass transition point of the water-dispersible resin contained in the second ink is 35° C. or lower, the resistance of the coating film of the second ink to cracking can be improved. Accordingly, it is thought that when the second ink is printed as an upper layer, the cracking resistance of the ink image of the upper layer can be improved.

The glass transition point of the water-dispersible resin contained in the second ink is more preferably 25° C. or lower.

When the glass transition point of a water-dispersible resin contained in an ink is increased, the scratch resistance of the ink coating film can be improved, but the fixation to substrates tends to deteriorate. However, when the ink set of an embodiment of the present invention is used, and a coating film of the first ink containing a water-dispersible resin having a lower glass transition point is formed beneath the coating film of the second ink containing a water-dispersible resin having a higher glass transition point, the scratch resistance can be improved while also improving the fixation to the substrate.

Measurement of the glass transition point is conducted by differential scanning calorimetry (DSC).

In embodiments, the water-dispersible resin having a glass transition point of less than −5° C. contained in the first ink preferably includes at least one resin selected from the group consisting of water-dispersible urethane resins, water-dispersible (meth)acrylic resins and water-dispersible styrene/(meth)acrylic resins.

In embodiments, the water-dispersible resin having a glass transition point of from −5° C. to 35° C. contained in the second ink preferably includes at least one resin selected from the group consisting of water-dispersible urethane resins, water-dispersible (meth)acrylic resins and water-dispersible styrene/(meth)acrylic resins.

There are no particular limitations on the water-dispersible urethane resin, provided the resin has a urethane skeleton and is water-dispersible. Examples of the water-dispersible urethane resins include polyether-type urethane resins that include ether linkages within the main chain besides the urethane linkages, polyester-type urethane resins that include ester linkages within the main chain besides the urethane linkages, and polycarbonate-type urethane resins that include carbonate linkages within the main chain besides the urethane linkages. Of these, preferable examples of the water-dispersible urethane resins include polycarbonate-type urethane resins and polyester-type urethane resins. One kind of water-dispersible urethane resin may be used, or a plurality of water-dispersible urethane resins may be used in combination.

Preferable examples of the water-dispersible urethane resins include anionic urethane resins having an anionic functional group such as a carboxyl group, a sulfo group or a hydroxyl group.

Specific examples of water-dispersible urethane resins having a glass transition point of less than −5° C. include Superflex 300 (glass transition point: −42° C.), Superflex 420 (glass transition point: −10° C.), Superflex 460 (glass transition point: −21° C.), Superflex 460S (glass transition point: −25° C.), Superflex 470 (glass transition point: −31° C.), Superflex 500M (glass transition point: −39° C.) and Superflex 740 (glass transition point: −34° C.), all manufactured by DKS Co. Ltd.

Further, specific examples of water-dispersible urethane resins having a glass transition point of from −5° C. to 35° C. include Superflex 150HS (glass transition point: 32° C.) manufactured by DKS Co. Ltd., DAOTAN TW 6490/35WA (glass transition point: 32° C.) manufactured by Daicel-Allnex Ltd., TAKELAC W-6061 (glass transition point: 25° C.) manufactured by Mitsui Chemicals, Inc., and UW-1701F (glass transition point: 5° C.) manufactured by Ube Industries, Ltd. These resins are anionic resins having a urethane skeleton.

There are no particular limitations on the water-dispersible styrene/(meth)acrylic resins and water-dispersible (meth)acrylic resins, and commercially available products may be used.

Examples of commercially available water-dispersible styrene/(meth)acrylic resins having a glass transition point of less than −5° C. and water-dispersible (meth)acrylic resins having a glass transition point of less than −5° C. include Mowinyl 6751 D (glass transition point: −32° C.), Mowinyl 6960 (glass transition point: −32° C.), Mowinyl 6963 (glass transition point: −28° C.), Mowinyl 702 (glass transition point: −19° C.), Mowinyl 8020 (glass transition point: −22° C.) and Mowinyl 966A (glass transition point: −32° C.), all manufactured by The Nippon Synthetic Chemical Industry Co., Ltd.

Examples of commercially available water-dispersible styrene/(meth)acrylic resins having a glass transition point of from −5° C. to 35° C. and water-dispersible (meth)acrylic resins having a glass transition point of from −5° C. to 35° C. include Mowinyl 6718 (glass transition point: 3° C.), Mowinyl 6750 (glass transition point: 0° C.) and Mowinyl 7720 (glass transition point: 4° C.) manufactured by The Nippon Synthetic Chemical Industry Co., Ltd., Joncryl PDX-7341 (glass transition point: 15° C.) and Joncryl PDX-7370 (glass transition point: 12° C.) manufactured by BASF Corporation, and NeoCryl A-1094 (glass transition point: 21° C.) and NeoCryl BT-62 (glass transition point: 22° C.) manufactured by DSM Coating Resins D.V.

The water-dispersible resin having a glass transition point of less than −5° C. may be used individually, or two or more kinds thereof may be used in combination.

The water-dispersible resin having a glass transition point of less than −5° C. is preferably included in the first ink in an amount, reported as a solid fraction (namely, the mass of only the resin) relative to the total mass of the first ink, of from 0.5 to 30% by mass (and more preferably a solid fraction amount of from 3 to 20% by mass, and even more preferably a solid fraction amount of from 5 to 15% by mass).

The water-dispersible resin having a glass transition point of from −5° C. to 35° C. may be used individually, or two or more kinds thereof may be used in combination.

The water-dispersible resin having a glass transition point of from −5° C. to 35° C. is preferably included in the second ink in an amount, reported as a solid fraction (namely, the mass of only the resin) relative to the total mass of the second ink, of from 0.5 to 15% by mass (and more preferably a solid fraction amount of from 1 to 10% by mass, and even more preferably a solid fraction amount of from 2 to 5% by mass).

<Water>

In embodiments, the first ink and the second ink preferably each contain mainly water as the aqueous solvent. There are no particular limitations on this water, but water containing minimal ionic components is preferred. In particular, from the viewpoint of the ink storage stability, the amount of polyvalent metal ions such as calcium ions is preferably kept low. Examples of the water include ion-exchanged water, distilled water and ultra-pure water.

From the viewpoint of viscosity regulation, the amount of water in each ink is preferably from 20% by mass to 80% by mass, and more preferably from 30% by mass to 70% by mass, relative to the total mass of the ink.

<Water-Soluble Solvent>

In embodiment, the first ink and the second ink preferably each include a water-soluble solvent.

From the viewpoints of viscosity regulation and moisture retention, a water-soluble organic solvent that is liquid at room temperature and miscible with water is preferred as the water-soluble solvent. Specific examples of water-soluble solvents that may be used include lower alcohols such as methanol, ethanol, 1-propanol, isopropanol, -butanol, 2-butanol, isobutanol, 1,3-propanediol, 1,3-butanediol, 1,2-butanediol, 1,2-pentanediol, 1,2-hexanediol and 2-methyl-2-propanol; glycols such as ethylene glycol, diethylene glycol, triethylene glycol, tetraethylene glycol, pentaethylene glycol, propylene glycol, dipropylene glycol and tripropylene glycol; glycerol; acetins (monoacetin, diacetin and triacetin); glycol derivatives such as diethylene glycol monomethyl ether, diethylene glycol monobutyl ether, diethylene glycol dimethyl ether, diethylene glycol monoethyl ether acetate, triethylene glycol monomethyl ether, triethylene glycol monoethyl ether, triethylene glycol monopropyl ether, triethylene glycol monobutyl ether, tripropylene glycol monobutyl ether, triethylene glycol monohexyl ether, tetraethylene glycol monomethyl ether, tetraethylene glycol monoethyl ether, tetraethylene glycol monobutyl ether, tetraethylene glycol dimethyl ether and tetraethylene glycol diethyl ether; as well as triethanolamine, 1-methyl-2-pyrrolidone, β-thiodiglycol and sulfolane. Low-molecular weight polyalkylene glycols, including polyethylene glycols having an average molecular weight within a range from 190 to 630, such as an average molecular weight of 200, 300, 400 or 600, diol-type polypropylene glycols having an average molecular weight within a range from 200 to 600, such as an average molecular weight of 400, and triol-type polypropylene glycols having an average molecular weight within a range from 250 to 800, such as an average molecular weight of 300 or 700, may be used.

These water-soluble solvents may be used individually or in combinations of two or more different solvents within each ink.

From the viewpoints of viscosity regulation and moisture retention, the amount of the water-soluble solvent within each ink is preferably from 1 to 80% by mass, and more preferably from 10 to 60% by mass, relative to the total mass of the ink.

In embodiments, the water-soluble solvent contained in the first ink and the water-soluble solvent contained in the second ink may be the same or different, but as described below, the use of solvents having mutually different boiling points is preferred.

In embodiments, the first ink preferably contains a water-soluble solvent having a boiling point of 230° C. or lower.

When the boiling point of the water-soluble solvent contained in the first ink is 230° C. or lower, because solvents with low boiling points are volatilized comparatively easily, the amount of solvent in the ink coating film can be reduced, the resin concentration can be increased, and a more uniform coating film can be formed, thereby further improving the fixation of the first ink.

In embodiments, the boiling point of the water-soluble solvent contained in the first ink is more preferably 215° C. or lower, and even more preferably 200° C. or lower.

In embodiments, from the viewpoint of reducing drying of the ink on the nozzle surface of the print head, the boiling point of the water-soluble solvent contained in the first ink is preferably at least 180° C.

Examples of preferred water-soluble solvents having a boiling point of 230° C. or lower include propylene glycol (boiling point: 187° C.), ethylene glycol (boiling point: 198° C.), 1,3-propanediol (boiling point: 214° C.), 1,3-butanediol (boiling point: 207° C.), 1,2-butanediol (boiling point: 191° C.), 1,2-pentanediol (boiling point: 206° C.), 1,2-hexanediol (boiling point: 223° C.), diethylene glycol monomethyl ether (boiling point: 194° C.), diethylene glycol monobutyl ether (boiling point: 230° C.), diethylene glycol dimethyl ether (boiling point: 162° C.) and diethylene glycol monoethyl ether acetate (boiling point: 217° C.), and, among these, propylene glycol, ethylene glycol (each of which is glycol), 1,3-propanediol, 1,3-butanediol, 1,2-butanediol, 1,2-penatnediol and 1,2-hexanediol (each of which is diol) are more preferred.

These water-soluble solvent having a boiling point of 230° C. or lower may be used individually, or a combination of two or more thereof may be used.

In a case where the first ink contains a water-soluble solvent having a boiling point of 230° C. or lower, the amount of the water-soluble solvent having a boiling point of 230° C. or lower in the first ink may be, for example, from 1 to 80% by mass, from 10 to 60% by mass, or from 10 to 40% by mass, relative to the total mass of the first ink.

In a case where the first ink contains a water-soluble solvent having a boiling point of 230° C. or lower, the amount of the water-soluble solvent having a boiling point of 230° C. or lower in the first ink may be, for example, 50% by mass or higher, 75% by mass or higher, or 100% by mass, relative to the total mass of water-soluble solvent contained in the first ink.

In embodiments, from the viewpoint of preventing yellowing and the like of the substrate, the heating temperature in the heat treatment step described below is preferably not too high. In embodiments, it is preferable that the heating temperature in the heat treatment step is lower than the boiling point of the water-soluble solvent contained in the first ink. Further, when the heating temperature in the heat treatment step is lower than the boiling point of the water-soluble solvent contained in the first ink, from the viewpoint of the fixation of the first ink, the difference between the heating temperature in the heat treatment step and the boiling point of the water-soluble solvent contained in the first ink is preferably not more than 120° C., and for example, may be not more than 100° C., or 80° C. or less.

Here, for calculating the difference between the heating temperature in the heat treatment step and the boiling point of the water-soluble solvent contained in the first ink, in a case where the first ink contains two or more water-soluble solvents, the boiling point of the water-soluble solvent that is contained in the first ink at the highest amount among the water-soluble solvents contained in the first ink is used as the boiling point of the water-soluble solvent contained in the first ink. Hereinafter, the water-soluble solvent that is contained in an ink at the highest amount among water-soluble solvent(s) contained in the ink may be sometimes referred to as "the main water-soluble solvent" of the ink. Here, in a case where two or more main water-soluble solvents are contained at the same amount in the first ink, the boiling point of the water-soluble solvent having the highest boiling point among these two or more main water-soluble solvents is used as the boiling point of the water-soluble solvent contained in the first ink for calculating the difference.

It is thought that when the heating temperature in the heat treatment step is lower than the boiling point of the water-soluble solvent contained in the first ink, and the difference between the heating temperature in the heat treatment step and the boiling point of the water-soluble solvent contained in the first ink is not more than 120° C., the water-soluble solvent contained in the first ink can be more easily volatilized in the heat treatment step, the amount of water-soluble solvent within the coating film of the first ink can be reduced, and the fixation of the first ink can be further improved.

In embodiments, the second ink preferably contains a water-soluble solvent having a boiling point of 260° C. or higher.

When the boiling point of the water-soluble solvent contained in the second ink is 260° C. or higher, volatilization of the water-soluble solvent contained in the second ink may be suppressed, shrinkage of the dot diameter of the second ink may be suppressed, meaning the dot diameter can be enlarged, and therefore the color density can be further enhanced.

In embodiments, the boiling point of the water-soluble solvent contained in the second ink is more preferably 280° C. or higher. The boiling point of the water-soluble solvent contained in the second ink may, for example, be within a range from 260° C. to 300° C.

Examples of preferred water-soluble solvents having a boiling point of 260° C. or higher include glycerol (boiling point: 290° C.), triethylene glycol (boiling point: 287° C.), tetraethylene glycol (boiling point: 314° C.), tripropylene glycol (boiling point: 268° C.), triethylene glycol monobutyl ether (boiling point: 272° C.), tetraethylene glycol monobutyl ether (boiling point: 304° C.), tripropylene glycol monobutyl ether (boiling point: 274° C.) and triethylene glycol monohexyl ether (boiling point: 261° C.), and, among these, glycerol (which is glycerol), triethylene glycol, tetraethylene glycol and tripropylene glycol (each of which is glycol) are more preferred.

These water-soluble solvent having a boiling point of 260° C. or higher may be used individually, or a combination of two or more thereof may be used.

In a case where the second ink contains a water-soluble solvent having a boiling point of 260° C. or higher, the amount of the water-soluble solvent having a boiling point of 260° C. or higher in the second ink may be, for example, from 1 to 80% by mass, from 10 to 60% by mass, or from 10 to 40% by mass, relative to the total mass of the second ink.

In a case where the second ink contains a water-soluble solvent having a boiling point of 260° C. or higher, the amount of the water-soluble solvent having a boiling point of 260° C. or higher in the second ink may be, for example, 50% by mass or higher, 75% by mass or higher, or 100% by mass, relative to the total mass of water-soluble solvent contained in the second ink.

In embodiments, the boiling point of the water-soluble solvent contained in the second ink is preferably at least 60° C. higher (and more preferably at least 80° C. higher) than the boiling point of the water-soluble solvent contained in the first ink. Here, for calculating the difference between the boiling point of the water-soluble solvent contained in the second ink and the boiling point of the water-soluble solvent contained in the first ink, in a case where two or more water-soluble solvents are contained in the first ink, the boiling point of the main water-soluble solvent of the first ink is used as the boiling point of the water-soluble solvent contained in the first ink, and, in a case where two or more water-soluble solvents are contained in the second ink, the boiling point of the main water-soluble solvent of the second ink is used as the boiling point of the water-soluble solvent contained in the second ink. Here, in a case where two or more main water-soluble solvents are contained at the same amount in one ink, the boiling point of the water-soluble solvent having the highest boiling point among these two or more main water-soluble solvents is used as the boiling point of the water-soluble solvent contained in the ink for calculating the difference.

When the boiling point of the water-soluble solvent contained in the second ink is at least 60° C. higher than the boiling point of the water-soluble solvent contained in the first ink, the color density of the second ink can be further enhanced. It is thought that the reason for this enhancement is as follows. When the boiling point of the water-soluble solvent contained in the second ink is at least 60° C. higher than the boiling point of the water-soluble solvent contained in the first ink, the volatility of the water-soluble solvent contained in the first ink is higher than that of the water-soluble solvent contained in the second ink. As a result, when the second ink is overprinted on the first ink, the coating film of the first ink, which due to volatilization of the water-soluble solvent is in a state having a comparatively low water-soluble solvent content at the ink surface, can be overlaid with the coating film of the second ink, which has a comparatively high water-soluble solvent content compared with the coating film of the first ink. In other words, the second ink, which contains a comparatively large amount of water-soluble solvent and is therefore in a state of low viscosity, is applied to the top of the coating film of the first ink, which as a result of volatilization of the water-soluble solvent is in a state having a high surface viscosity, and as a result, it is thought that the phenomenon whereby the second ink sinks into the first ink is suppressed, and the dots of the second ink can therefore spread more easily, enabling the color density to be further enhanced.

In embodiments, it is preferable that the first ink contains a water-soluble solvent having a boiling point of 230° C. or lower and the second ink contains a water-soluble solvent having a boiling point of 260° C. or higher.

In embodiments, it is also preferable that the first ink contains a water-soluble solvent having a boiling point of 230° C. or lower, the second ink contains a water-soluble solvent having a boiling point of 260° C. or higher, and the boiling point of the water-soluble solvent contained in the second ink is at least 60° C. higher than the boiling point of the solvent contained in the first ink.

In embodiments, it is also preferable that the first ink contains a water-soluble solvent having a boiling point of 230° C. or lower, the second ink contains a water-soluble solvent having a boiling point of 260° C. or higher, the boiling point of the water-soluble solvent contained in the second ink is at least 60° C. higher than the boiling point of the solvent contained in the first ink, and the difference between the heating temperature in the heat treatment step and the boiling point of the water-soluble solvent contained in the first ink is not more than 12.0° C.

<Coloring Material>

In embodiments, the first ink and the second ink preferably each contain a coloring material.

Any of the coloring materials that can typically be used in monochrome printing or color printing may be used as the coloring material.

The first ink preferably contains a coloring material of a color that can ask the color of the substrate, and more preferably contains a white coloring material.

The second ink preferably contains a non-white coloring material.

Although there are no particular limitations on the coloring material, pigments can be preferably used. Any of the pigments typically used in the technical field can be used.

Specific examples of non-white pigments that may be used include organic pigments, examples of which include azo-based pigments, phthalocyanine-based pigments, dye-based pigments, condensed polycyclic pigments, nitro-based pigments and nitroso-based pigments (such as brilliant carmine CB, lake red C, Watchung red, disazo yellow, Hansa yellow, phthalocyanine blue, phthalocyanine green, alkali blue and aniline black); inorganic pigments, examples of which include metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. The average particle size of such a pigment is preferably from 50 to 500 nm, and more preferably from 50 to 200 nm. From the viewpoint of color development, the average particle size of such a pigment is preferably at least 50 nm, and from the viewpoint of discharge stability, the average particle size is preferably not more than 500 nm.

Specific examples of white pigments include inorganic pigments such as titanium oxide, zinc oxide, zinc sulfide, antimony oxide and zirconium oxide. Besides inorganic pigments, examples of white pigments further includes, hollow resin microparticles and polymer microparticles. Among these, from the viewpoint of covering power, the use of titanium oxide is preferred. From the viewpoint of the masking properties, the average particle size of the titanium oxide is preferably at least 50 nm. From the viewpoint of discharge stability, the average particle size is preferably not more than 500 nm. In those cases where titanium oxide is used, in order to suppress any photocatalytic action, it is preferable to use titanium oxide that has been surface treated with alumina or silica. The amount of this surface treatment preferably represents about 5 to 20% by mass of the pigment.

In each of the inks, one pigment may be used individually, or combinations of two or more pigments may be used.

The amount added of the pigment varies depending on the type of pigment used, but from the viewpoints of the masking effect and the color development and the like, the amount of the pigment is preferably from about 1 to about 30% by mass, and more preferably from 1 to 15% by mass, relative to the total mass of the ink.

A pigment dispersant typified by polymeric dispersants and surfactant-type dispersants is preferably used to ensure stable dispersion of the pigment in the ink.

Examples of commercially available polymeric dispersants include the TEGO Dispers series manufactured by Evonik (including TEGO Dispers 740W, TEGO Dispers 750W, TEGO Dispers 755W, TEGO Dispers 757W and TEGO Dispers 760W), the Solsperse series manufactured by Lubrizol (including Solsperse 20000, Solsperse 27000, Solsperse 41000, Solsperse 41090, Solsperse 43000, Solsperse 44000 and Solsperse 46000), the Joncryl series manufactured by Johnson Polymer (including Joncryl 57, Joncryl 60, Joncryl 62, Joncryl 63, Joncryl 71 and Joncryl 501), as well as DISPERBYK-102, DISPERBYK-185, DISPERBYK-190, DISPERBYK-193 and DISPERBYK-199 manufactured by BYK, FUJI SP A-54 manufactured by Fuji Pigment Co., Ltd., and Polyvinylpyrrolidone K-30 and Polyvinylpyrrolidone K-90 manufactured by DKS Co. Ltd.

Examples of the surfactant-type dispersants include anionic surfactants such as the DEMOL series manufactured by Kao Corporation (including DEMOL EP, DEMOL N, DEMOL RN, DEMOL NL, DEMOL RNL and DEMOL T-45), and nonionic surfactants such as the EMULGEN series manufactured by Kao Corporation (including EMULGEN A-60, EMULGEN A-90, EMULGEN A-500, EMULGEN B-40, EMULGEN L-40 and EMULGEN 420).

One pigment dispersant may be used singly. Two or more pigment dispersants may be used in combinations.

When used, there are no particular limitations on the amount of the pigment dispersant added to the ink, which may vary depending on the type of pigment dispersant used, but generally, the amount of the pigment dispersant (as the amount of the active component (solid fraction)), reported as a mass ratio relative to a value of 1 for the amount of the pigment (as the amount of the active component (solid fraction)), is preferably within a range from 0.005 to 0.5.

Self-dispersing pigments in which the pigment surface has been modified with hydrophilic functional groups may be used. Examples of commercially available self-dispersing pigments include the CAB-O-JET series manufactured by Cabot Corporation (including CAB-O-JET 200, CAB-O-JET 300, CAB-O-JET 250C, CAB-O-JET 260M and CAB-O-JET 270C), and the products BONJET BLACK CW-1S, BONJET BLACK CW-2, BONJET BLACK CW-3, BONJET BLACK CW-4, BONJET BLACK CW-5 and BONJET BLACK CW-6 manufactured by Orient Chemical Industries, Ltd.

Microencapsulated pigments in which the pigment is coated with a resin may be used.

<Other Components>

In embodiments, the first ink and the second ink may each further contain other components as appropriate. Examples of these other components include dispersion assistants, humectants (moisture retention agents), surface tension regulators (surfactants), fixing agents, pH modifiers, antioxidants, preservatives and crosslinking agents.

Here, the term "dispersion assistants" describes dispersants that are added to pigment dispersions that have already been dispersed, and typical dispersants may be used as these dispersion assistants. Examples of commercially available products that may be used include the products mentioned above as examples of pigment dispersants.

For the surface tension regulator, any of an anionic surfactant, a cationic surfactant, an amphoteric surfactant or a nonionic surfactant may be used. For the surface tension regulator, for example, a polymer-based, silicone-based or fluorine-based surfactant may be used.

Adding a surfactant may further facilitate the stable discharge of the ink by an inkjet method, and also makes it easier to appropriately control the penetration of the ink, and is consequently preferred. The amount added of the surfactant (the total amount of surfactant in those cases when the surfactant is also used as a pigment dispersant) may vary depending on the type of surfactant used, but from the viewpoints of the ink surface tension and the rate of ink penetration into substrates such as fabrics, the amount is preferably within a range from 0.1 to 10% by mass of the ink.

Specific examples of anionic surfactants include the EMAL series (including EMAL 0, EMAL 10, EMAL 2F, EMAL 40 and EMAL 20C), the NEOPELEX series (including NEOPELEX GS, NEOPELEX G-15, NEOPELEX G-25 and NEOPELEX G-65), the PELEX series (including PELEX OT-P, PELEX TR, PELEX CS, PELEX TA, PELEX SS-L and PELEX SS-H), and the DEMOL series (including DEMOL N, DEMOL NL, DEMOL RN and DEMOL MS), all manufactured by Kao Corporation.

Examples of cationic surfactants include the ACETAMIN series (including ACETAMIN 24 and ACETAMIN 86), the QUARTAMIN series (including QUARTAMIN 24P, QUARTAMIN 86P, QUARTAMIN 60W and QUARTAMIN 86W), and the SANISOL series (including SANISOL C and SANISOL B-50), all manufactured by Kao Corporation.

Examples of nonionic surfactants include acetylene glycol-based surfactants, such as the Surfynol series manufactured by Air Products and Chemicals, Inc. (including Surfynol 104E, Surfynol 104H, Surfynol 420, Surfynol 440, Surfynol 465 and Surfynol 485) and Olfine E1004 Olfine E1010 and Olfine E1020 manufactured by Nissin Chemical Industry Co., Ltd., and polyoxyethylene alkyl ether-based surfactants, such as the EMULGEN series manufactured by Kao Corporation (including EMULGEN 102KG, EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705. EMULGEN 707, EMULGEN 709, EMULGEN 1108, EMULGEN 4085 and EMULGEN 2025G).

Examples of amphoteric surfactants include the AMPHITOL series manufactured by Kao Corporation (including AMPHITOL 20BS, AMPHITOL 24B, AMPHITOL 86B, AMPHITOL 20YB and AMPHITOL 20N).

An electrolyte may be added to the ink to adjust the viscosity or pH of the ink. Examples of the electrolyte include sodium sulfate, potassium hydrogen phosphate, sodium citrate, potassium tartrate and sodium borate, and combinations of two or more electrolytes may also be used. Other compounds such as sulfuric acid, nitric acid, acetic acid, sodium hydroxide, potassium hydroxide, ammonium hydroxide and triethanolamine may also be used as ink thickening assistants or pH modifiers.

When an antioxidant is added, oxidation of the ink components may be prevented, and the storage stability of the ink may be improved. Examples of antioxidants that may be used include L-ascorbic acid, sodium L-ascorbate, sodium isoascorbate, potassium sulfite, sodium sulfite, sodium thiosulfate, sodium dithionite and sodium pyrosulfite.

When a preservative is added, decomposition of the ink may be prevented and the storage stability of the ink may be improved. Examples of preservatives that may be used include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

When a crosslinking agent is used, strong linkages may be formed between resin molecules and/or between the resin and the coloring material, whereby it is possible to reduce the likelihood of cohesive failure.

Examples of the crosslinking agent include blocked isocyanate-based compounds, which promote crosslinking under heating. The amount of the blocked isocyanate-based compound is preferably from 0.1 to 3% as a mass ratio of relative to the amount of the resin (as the amount of solid fraction). From the viewpoint of the storage stability, the amount of the blocked isocyanate-based compound is preferably not more than 3%, whereas from the viewpoint of the crosslinking effect, the amount of the blocked isocyanate-based compound is preferably at least 0.1%, as a mass ratio of relative to the amount of the resin (as the amount of solid fraction).

A blocked isocyanate-based compound means a compound in which the isocyanate group is protected with a blocking agent that dissociates upon heating, thus regenerating the active isocyanate group, it is thought that the isocyanate group generated by this heating reacts with the active hydrogen regions on the substrate such as a fabric, thereby forming crosslinked structures such as urethane linkages and urea linkages. Examples of the blocking agent include phenol-based compounds, aromatic secondary amine compounds, cyclic amine compounds, lactam compounds, oxime compounds and sodium sulfite.

More specifically, the blocked isocyanate-based compound is preferably a compound having a urethane skeleton. Examples of commercially available products that may be used include the various products of the ELASTRON series and ELASTRON RN series manufactured by DKS Co. Ltd., and particularly preferred examples include ELASTRON E37, ELASTRON H-3, ELASTRON C-52. ELASTRON MF25, ELASTRON W-22, ELASTRON S-24, ELASTRON BN-08, ELASTRON BN-11, ELASTRON BN-27, ELASTRON BN-45, ELASTRON BN-69 and ELASTRON BN-77.

<Ink Physical Properties>

In embodiments, the viscosity of the first ink and the viscosity of the second ink may each be adjusted as appropriate, but from the viewpoint of the discharge properties, the viscosity of the first ink and the viscosity of the second are each, independently, preferably from 1 mPa·s to 30 mPa·s. These viscosity values describe the ink viscosity at 10 Pa when the shear stress is increased from 0 Pa at a rate of 0.1 Pa/s at a temperature of 23° C.

In embodiments, the surface tension of the first ink and the surface tension of the second ink are each, independently, preferably within a range from 30 to 50 mN/m at 25° C. In order to control the ink penetration, a method may be used in which, for example, the surface tension of the ink is controlled to adjust the rate of penetration of the ink into the substrate. When the surface tension of the ink is from 30 mN/m to 50 mN/m, a favorable ink penetration rate may facilitate the formation of an ink film, and favorable dischargeability of the ink from the inkjet nozzles may also obtained more easily.

[Method for Producing Printed Textile Item]

The method for producing a printed textile item according to embodiments is described below.

The method for producing a printed textile item according to embodiments uses the aqueous inkjet ink set for textile printing according to the embodiments described above, and includes applying the first ink to a substrate using an inkjet recording method (sometimes referred to as the "step of applying the first ink"), and applying the second ink, using an inkjet recording method, to at least a portion of the region of the substrate to which the first ink has been applied (sometimes referred to as the "step of applying the second ink").

In embodiments, the first ink and the second ink are each preferably applied to a substrate such as a fabric using an inkjet recording method.

The inkjet printer used may employ any of various systems, including a piezo system, electrostatic system or thermal system, and for example, liquid droplets of the inks may be discharged from the inkjet head based on a digital signal, and the discharged ink droplets then may be adhered to the substrate.

The second ink is preferably applied to at least a portion of the region to which the first ink has been applied, and is more preferably applied to the entire region to which the first ink has been applied. In the step of applying the second ink, two or more second inks may be applied. For example, a white ink may be applied as the first ink to form a base, and multicolor printing then may be performed by using, as the second inks, two or more inks selected from among a black ink and color inks such as a red ink.

In embodiments, although there are no particular limitations on the substrate, fabrics may be preferably used. Examples of fabrics that may be used include fabrics formed from any natural and/or synthetic fibers such as cotton, silk, wool, hemp, nylon, polyester, rayon, acetate and cupra. The fabric may be a woven fabric, a knitted fabric, or a nonwoven fabric and the like.

Further, the substrate may be a colored substrate. For example, the substrate may be black or a dark color.

Although there are no particular limitations on the amount applied of the first ink, the amount applied of the coloring material contained in the first ink per 1 m$^2$ of the substrate is preferably within a range from 0.3 to 40 g/m$^2$, and more preferably from 0.5 to 35 g/m$^2$.

Although there are no particular limitations on the amount applied of the second ink, from the viewpoint of the cracking resistance of the obtained image, the amount applied of the coloring material contained in the second ink per 1 m$^2$ of the substrate is preferably not more than 1.5 g/m$^2$, and more preferably 1.4 g/m$^2$ or less. For example, the amount applied of the second ink, reported as the amount applied of the coloring material contained in the second ink per 1 m$^2$ of the substrate, is preferably from 0.3 to 1.5 g/m$^2$.

In embodiments, the method preferably further includes heating the substrate (sometimes referred to as a "heat treatment step"), following the step of applying the first ink and/or the step of applying the second ink. This may dry the ink, and may also cause the water-dispersible resin to form a film, making it easier to form a strong ink film.

The heat treatment step may be performed after one of, or both, the step of applying the first ink and the step of applying the second ink. The heat treatment step is preferably performed after the step of applying the second ink. For example, after performing the step of applying the first ink, the step of applying the second ink may be conducted without conducting a heat treatment after the step of applying the first ink, and then, a heat treatment step is performed after the step of applying the second ink.

There are no particular limitations on the heating conditions used in the heat treatment step.

For example, when a cotton T-shirt is used as the substrate, since the cotton fibers tend to be prone to discoloration if the heating temperature exceeds 180° C., the heating temperature is preferably 180° C. or lower.

For example, in the heat treatment step, the heating temperature may be set to about 100° C. to about 180° C. For example, the heat treatment may be performed under conditions including heating at a heating temperature of 160° C. for about 60 seconds.

In embodiments, the heating temperature in the heat treatment step is preferably lower than the boiling point of the water-soluble solvent contained in the first ink. The difference between the heating temperature in the heat treatment step and the boiling point of the water-soluble solvent contained in the first ink is preferably not more than 120° C. (for example, not more than 100° C., or 80° C. or less).

In embodiments, a step of applying, to at least the print region of the substrate surface, a pretreatment liquid containing a filler or a coagulant for coagulating components such as the coloring material contained in the ink may be performed prior to the step of applying the first ink. The pretreatment liquid may be applied to the entire substrate surface including the print region.

Examples

The present invention is described below in further detail using a series of examples, but the present invention is in no way limited by these examples.

[Preparation of Aqueous Inkjet Inks for Textile Printing]
(Preparation of White (W) Pigment Dispersion)

First, 250 g of a white pigment R-21N (titanium oxide, manufactured by Sakai Chemical Industry Co., Ltd.) and 10 g of DENIM, EP (a polycarboxylic acid-type polymeric surfactant, manufactured by Kao Corporation) as a dispersant were mixed with 740 g of ion-exchanged water, and a beads mill containing ø0.5 mm zirconia beads was used to disperse the mixture to obtain a white (W) pigment dispersion.

(Preparation of Inks)

The materials shown in Table 1 were mixed in the mass ratios shown in Table 1, and the resulting mixtures were each filtered through a 3 µm membrane filter to remove coarse particles, thus obtaining a series of aqueous inkjet inks for textile printing, including white (W) inks W-1 to W-5, black (K) inks Bk-1 to Bk-6, a cyan (C) ink C-1, a magenta (M) ink M-1, and a yellow (Y) ink Y-1. For the white (W) inks W-1 to W-5, the previously prepared white (W) pigment dispersion as described above was used, and mixing of the component was conducted so as to obtain the mass ratio between the components shown in Table 1.

The materials shown in Table 1 are listed below. In Table 1, the numerical values without units shown for each component indicate % by mass values.

R-21N: titanium oxide (white pigment), manufactured by Sakai Chemical Industry Co., Ltd.

BONJET BLACK CW-6: a carbon black self-dispersing pigment dispersion, manufactured by Orient Chemical industries, Ltd., solid fraction: 15.1% by mass CAB-O-JET 4500, a cyan self-dispersing pigment dispersion manufactured by Cabot Corporation, solid fraction: 15.0% by mass CAB-O-JET 465M, a magenta self-dispersible pigment dispersion manufactured by Cabot Corporation, solid fraction: 15.2% by mass CAB-O-JET 470Y, a yellow self-dispersible pigment dispersion manufactured by Cabot Corporation, solid fraction: 15.1% by mass DEMOL EP: a polycarboxylic acid type polymeric surfactant (a surfactant-type dispersant) manufactured by Kao Corporation Water: Ion-Exchanged Water Mowinyl 966A: a water-dispersible styrene/acrylic resin, manufactured by The Nippon Synthetic Chemical Industry Co., Ltd., solid fraction: 45.0% by mass, glass transition point (Tg): −32° C.

Superflex 420: a water-dispersible urethane resin, manufactured by DKS Co. Ltd., solid fraction: 32.0% by mass, glass transition point (TO: −10° C.

Mowinyl 6750: a water-dispersible acrylic resin, manufactured by The Nippon Synthetic Chemical Industry Co., Ltd., solid fraction: 45.0% by mass, glass transition point (Tg): 0° C.

Superflex 150H: a water-dispersible urethane resin, manufactured by DKS Co. Ltd., solid fraction: 38.0% by mass, glass transition point (Tg): 32° C.

Superflex 210: a water-dispersible urethane resin, manufactured by DKS Co. Ltd., solid fraction: 35.0% by mass, glass transition point (Tg): 41° C.

Propylene glycol: manufactured by Wako Pure Chemical Industries, Ltd.

1,2-hexanediol: manufactured by Wako Pure Chemical Industries, Ltd.

Diethylene glycol: manufactured by Wako Pure Chemical Industries, Ltd.

2-pyrrolidone: manufactured by Wako Pure Chemical Industries, Ltd.

Tripropylene glycol: manufactured by Wako Pure Chemical industries, Ltd.

Glycerol: manufactured by Wako Pure Chemical Industries, Ltd.

Surfynol 465: an acetylene-based surfactant, manufactured by Air Products and Chemicals, Inc.

TABLE 1

| | Material | Solid fraction (mass %) | Tg (° C.) | Boiling point (° C.) | W-1 | W-2 | W-3 | W-4 | W-5 |
|---|---|---|---|---|---|---|---|---|---|
| Pigment | R-21N | — | | | 10.0 | 10.0 | 1.0.0 | 10.0 | 10.0 |
| Pigment dispersant | BONJET BLACK CW-6 | 15.1% | | | | | | | |
| | CAB-O-JET 450C | 15.0% | | | | | | | |
| | CAB-O-JET 465M | 15.2% | | | | | | | |
| | CAB-O-JET 470Y | 15.1% | | | | | | | |
| Dispersant | Demol EP | 24.0% | | | 0.4 | 0.4 | 0.4 | 0.4 | 0.4 |
| Water | Ion-exchanged water | — | | | 41.9 | 31.1 | 41.9 | 41.9 | 41.9 |
| Water-dispersible resin | Mowinyl 966A | 45.0% | −30 | | 26.7 | | 26.7 | | 26.7 |
| | Superflex420 | 32.0% | −10 | | | 37.5 | | | |
| | Mowinyl 6750 | 45.0% | 0 | | | | | 26.7 | |
| | Superflex 150HS | 38.0% | 32 | | | | | | |
| | Superflex 210 | 35.0% | 41 | | | | | | |
| Water-soluble solvent | Propylene glycol | — | | 187 | 20.0 | 20.0 | | 20.0 | |
| | 1,2-hexanediol | — | | 723 | | | 20.0 | | |
| | Diethylene glycol | — | | 245 | | | | | 20.0 |
| | 2-pyrrolidone | — | | 251 | | | | | |
| | Tripropylene glycol | — | | 268 | | | | | |
| | Glycerol | — | | 290 | | | | | |
| Surfactant | Surfynol 465 | — | | | 1.0 | 1.0 | 1.0 | 1.0 | 1.0 |
| | Total | | | | 100.0 | 100.0 | 100.0 | 100.0 | 100.0 |

| | | Black ink | | | | | | Cyan ink | Magenta ink | Yellow ink |
|---|---|---|---|---|---|---|---|---|---|---|
| | Material | Bk-1 | Bk-2 | Bk-3 | Bk-4 | Bk-5 | Bk-6 | C-1 | M-1 | Y-1 |
| Pigment | R-21N | | | | | | | | | |
| Pigment dispersant | BONJET BLACK CW-6 | 30.0 | 30.0 | 30.0 | 30.0 | 30.0 | 30.0 | | | |
| | CAB-O-JET 450C | | | | | | | 32.0 | | |
| | CAB-O-JET 465M | | | | | | | | 30.0 | |
| | CAB-O-JET 470Y | | | | | | | | | 28.0 |
| Dispersant | Demol EP | | | | | | | | | |
| Water | Ion-exchanged water | 37.2 | 39.0 | 37.2 | 34.9 | 36.1 | 37.2 | 35.2 | 37.2 | 39.2 |
| Water-dispersible resin | Mowinyl 966A | | | | | | | | | |
| | Superflex420 | | | | 14.1 | | | | | |
| | Mowinyl 6750 | | 10.0 | | | | | | | |
| | Superflex 150HS | 11.8 | | 11.8 | | | 11.8 | 11.8 | 11.8 | 11.8 |
| | Superflex 210 | | | | | 12.9 | | | | |
| Water-soluble solvent | Propylene glycol | | | | | | | | | |
| | 1,2-hexanediol | | | | | | | | | |
| | Diethylene glycol | | | | | | | 20.0 | | |
| | 2-pyrrolidone | | | 20.0 | | | | | | |
| | Tripropylene glycol | | | | | | | | | |
| | Glycerol | 20.0 | 20.0 | | 20.0 | 20.0 | | 20.0 | 20.0 | 20.0 |
| Surfactant | Surfynol 465 | 1.0 | 1.0 | 1.0 | 1.0 | 1.0 | 1.0 | 1.0 | 1.0 | 1.0 |
| | | 100.0 | 100.0 | 100.0 | 100.0 | 100.0 | 100.0 | 100.0 | 100.0 | 100.0 |

[Evaluations]
<Preparation and Evaluation of Printed Textile Items>

Each of the ink sets shown in Tables 2 to 8 was loaded into a textile printer MMP8130 manufactured by Mastermind Inc., and an image was printed onto a 100% cotton T-shirt "Printstar 085-cvt" substrate in the manner described below. In Tables 2 to 8, "First" indicates the "first ink", and "Second" indicates the "second ink". As shown in Tables 2 to 8, in Examples 1 to 33 and Comparative Examples 1 to 9, a white ink was used as the first ink, and a black (K) ink, cyan (C) ink, magenta (M) ink or yellow (Y) ink was used as the second ink.

Specifically, using a white ink as the first ink, and using a white ink discharge amount (application amount) that yielded an applied amount of the pigment within the white ink of 30 g/m$^2$, a 15 cm×15 cm solid image of White ink was printed onto the T-shirt substrate. Subsequently, a 14 cm×14 cm solid image of a black (K), cyan (C), magenta (M) or yellow (Y) ink was printed on the white ink using a black (K), cyan (C), magenta (M) or yellow (Y) ink as the second ink, and using a second ink discharge amount (application amount) that yielded an applied amount of the pigment within the second ink shown in Tables 2 to 8. Subsequently, the printed item was subjected to a heating treatment (hot press treatment) by heating for 60 seconds at one of three temperature levels, namely 80° C., 110° C. or 170° C.

Each of the printed textile items obtained in this manner was evaluated for fixation of the first ink, scratch resistance of the second ink image, color density of the second ink image, and cracking resistance of the second ink image using the methods described below.

The results are shown in Tables 2 to 8.
<Fixation of First Ink>

Using the prepared printed textile item as a test piece, a test was performed using a type-II rubbing tester (RT-200, manufactured by Daiei Kagaku Seiki Mfg. Co., Ltd.) in accordance with the method prescribed in BS L0849. The degree of stripping of the white ink coating film from the substrate as a result of the rubbing was inspected visually, and evaluated against the following criteria.

A: stripping of the white ink coating film was less than 5% of the surface area subjected to rubbing
B: stripping of the white ink coating film was at least 5% but less than 15% of the surface area subjected to rubbing
C: stripping of the white ink coating film was 15% or more of the surface area subjected to rubbing
<Scratch Resistance of Second Ink Image>

The printed surface of the printed textile item was rubbed using a commercially available toothbrush (bristle material: nylon, hardness: normal), by rubbing the toothbrush 10 times back and forth across the surface of the printed image with a load of 100 g applied to the head of the toothbrush, and the degree of scratching of the image was then inspected visually from a distance of 30 cm, and evaluated against the following criteria.

A: no scratches
B: some scratches, but not easily noticeable
C: noticeable scratches
<Color Density of Second Ink Image>

Using an X-Rite eXact device manufactured by X-Rite, Inc., the OD value of the color ink solid image portion of the printed textile item was measured.
<Cracking Resistance of Second Ink Image>

The color ink solid image portion of the printed textile item was repeatedly folded through 180° C. and then returned to normal, with the fold line formed within the solid image portion, and the portion of the solid image along the fold line was then inspected visually, and the cracking resistance of the second ink image was evaluated against the following criteria.

A: even after 100 repetitions of 180° folding, no cracking was observed
B: after 10 repetitions of 180° folding, no cracking was observed, but after 100 repetitions of 180° folding, the cracking was observed
C: after 10 repetitions of 180° folding, cracking was observed

TABLE 2

| | Example 1 | | Example 2 | | Example 3 | | Example 4 | | Example 5 | | Example 6 | |
|---|---|---|---|---|---|---|---|---|---|---|---|---|
| | First W-1 | Second Bk-1 | First W-1 | Second Bk-1 | First W-1 | Second Bk-1 | First W-2 | Second Bk-1 | First W-2 | Second Bk-1 | First W-2 | Second Bk-1 |
| Resin glass transition point Tg [° C.] | −30 | 32 | −30 | 32 | −30 | 32 | −10 | 32 | −10 | 32 | −10 | 32 |
| Solvent boiling point [° C.] | 187 | 290 | 187 | 290 | 187 | 290 | 187 | 290 | 187 | 290 | 187 | 290 |
| Heating temperature in heat treatment step [° C.] | 80 | | 110 | | 170 | | 80 | | 110 | | 170 | |
| Boiling point of water-soluble solvent in first ink—heating temperature [° C.] | 107 | | 77 | | 17 | | 107 | | 77 | | 17 | |
| Boiling point of water-soluble solvent in second ink—boiling point of water-soluble solvent in first ink [° C.] | 103 | | 103 | | 103 | | 103 | | 103 | | 103 | |
| Application amount of pigment contained in second ink [g/m$^2$] | 1.4 | | 1.4 | | 1.4 | | 1.4 | | 1.4 | | 1.4 | |
| Fixation of first ink | A | | A | | A | | A | | A | | A | |
| Scratch resistance of second ink image | A | | A | | A | | A | | A | | A | |
| Color density of second ink image (OD value) | 1.29 | | 1.32 | | 1.28 | | 1.27 | | 1.26 | | 1.26 | |
| Cracking resistance of second ink image | A | | A | | A | | A | | A | | A | |

TABLE 3

| | Example 7 | | Example 8 | | Example 9 | | Example 10 | | Example 11 | | Example 12 | |
| --- | --- | --- | --- | --- | --- | --- | --- | --- | --- | --- | --- | --- |
| | First W-3 | Second Bk-1 | First W-3 | Second Bk-1 | First W-3 | Second Bk-1 | First W-1 | Second Bk-2 | First W-1 | Second Bk-2 | First W-1 | Second Bk-2 |
| Resin glass transition point Tg [° C.] | −30 | 32 | −30 | 32 | −30 | 32 | −30 | 0 | −30 | 0 | −30 | 0 |
| Solvent boiling point [° C.] | 223 | 290 | 223 | 290 | 223 | 290 | 187 | 290 | 187 | 290 | 187 | 290 |
| Heating temperature in heat treatment step [° C.] | 80 | | 110 | | 170 | | 80 | | 110 | | 170 | |
| Boiling point of water-soluble solvent in first ink—heating temperature [° C.] | 143 | | 113 | | 53 | | 107 | | 77 | | 17 | |
| Boiling point of water-soluble solvent in second ink—boiling point of water-soluble solvent in first ink [° C.] | 67 | | 67 | | 67 | | 103 | | 103 | | 103 | |
| Application amount of pigment contained in second ink [g/m$^2$] | 1.4 | | 1.4 | | 1.4 | | 1.4 | | 1.4 | | 1.4 | |
| Fixation of first ink | B | | A | | A | | A | | A | | A | |
| Scratch resistance of second ink image | A | | A | | A | | A | | A | | A | |
| Color density of second ink image (OD value) | 1.27 | | 1.28 | | 1.31 | | 1.32 | | 1.29 | | 1.28 | |
| Cracking resistance of second ink image | A | | A | | A | | A | | A | | A | |

TABLE 4

| | Example 13 | | Example 14 | | Example 15 | | Comparative Example 1 | | Comparative Example 2 | | Comparative Example 3 | |
| --- | --- | --- | --- | --- | --- | --- | --- | --- | --- | --- | --- | --- |
| | First W-1 | Second Bk-3 | First W-1 | Second Bk-3 | First W-1 | Second Bk-3 | First W-4 | Second Bk-1 | First W-4 | Second Bk-1 | First W-4 | Second Bk-1 |
| Resin glass transition point Tg [° C.] | −30 | 32 | −30 | 32 | −30 | 32 | 0 | 32 | 0 | 32 | 0 | 32 |
| Solvent boiling point [° C.] | 187 | 268 | 187 | 268 | 187 | 268 | 187 | 290 | 187 | 290 | 187 | 290 |
| Heating temperature in heat treatment step [° C.] | 80 | | 110 | | 170 | | 80 | | 110 | | 170 | |
| Boiling point of water-soluble solvent in first ink—heating temperature [° C.] | 107 | | 77 | | 17 | | 107 | | 77 | | 17 | |
| Boiling point of water-soluble solvent in second ink—boiling point of water-soluble solvent in first ink [° C.] | 81 | | 81 | | 811 | | 103 | | 103 | | 103 | |
| Application amount of pigment contained in second ink [g/m$^2$] | 1.4 | | 1.4 | | 1.4 | | 1.4 | | 1.4 | | 1.4 | |
| Fixation of first ink | A | | A | | A | | C | | C | | C | |
| Scratch resistance of second ink image | A | | A | | A | | A | | A | | A | |
| Color density of second ink image (OD value) | 1.27 | | 1.29 | | 1.30 | | 1.29 | | 1.26 | | 1.26 | |
| Cracking resistance of second ink image | A | | A | | A | | A | | A | | A | |

TABLE 5

| | Example 16 | | Example 17 | | Example 18 | | Comparative Example 4 | | Comparative Example 5 | | Comparative Example 6 | |
| --- | --- | --- | --- | --- | --- | --- | --- | --- | --- | --- | --- | --- |
| | First W-5 | Second Bk-1 | First W-5 | Second Bk-1 | First W-5 | Second Bk-1 | First W-1 | Second Bk-4 | First W-1 | Second Bk-4 | First W-1 | Second Bk-4 |
| Resin glass transition point Tg [° C.] | −30 | 32 | −30 | 32 | −30 | 32 | −30 | −10 | −30 | −10 | −30 | −10 |
| Solvent boiling point [° C.] | 245 | 290 | 245 | 290 | 245 | 290 | 187 | 290 | 187 | 290 | 187 | 290 |
| Heating temperature in heat treatment step [° C.] | 80 | | 110 | | 170 | | 80 | | 110 | | 170 | |

TABLE 5-continued

|  | Example 16 | | Example 17 | | Example 18 | | Comparative Example 4 | | Comparative Example 5 | | Comparative Example 6 | |
| --- | --- | --- | --- | --- | --- | --- | --- | --- | --- | --- | --- | --- |
|  | First W-5 | Second Bk-1 | First W-5 | Second Bk-1 | First W-5 | Second Bk-1 | First W-1 | Second Bk-4 | First W-1 | Second Bk-4 | First W-1 | Second Bk-4 |
| Boiling point of water-soluble solvent in first ink—heating temperature [° C.] | 165 | | 135 | | 75 | | 107 | | 77 | | 17 | |
| Boiling point of water-soluble solvent in second ink—boiling point of water-soluble solvent in first ink [° C.] | 45 | | 45 | | 45 | | 103 | | 103 | | 103 | |
| Application amount of pigment contained in second ink [g/m²] | 1.4 | | 1.4 | | 1.4 | | 1.4 | | 1.4 | | 1.4 | |
| Fixation of first ink | B | | B | | B | | A | | A | | A | |
| Scratch resistance of second ink image | A | | A | | A | | C | | C | | C | |
| Color density of second ink image (OD value) | 1.24 | | 1.25 | | 1.24 | | 1.28 | | 1.28 | | 1.26 | |
| Cracking resistance of second ink image | A | | A | | A | | A | | A | | A | |

TABLE 6

|  | Comparative Example 7 | | Comparative Example 8 | | Comparative Example 9 | | Example 19 | | Example 20 | | Example 21 | |
| --- | --- | --- | --- | --- | --- | --- | --- | --- | --- | --- | --- | --- |
|  | First W-1 | Second Bk-5 | First W-1 | Second Bk-5 | First W-1 | Second Bk-5 | First W-1 | Second Bk-6 | First W-1 | Second Bk-6 | First W-1 | Second Bk-6 |
| Resin glass transition point Tg [° C.] | −30 | 41 | −30 | 41 | −30 | 41 | −30 | 32 | −30 | 32 | −30 | 32 |
| Solvent boiling point [° C.] | 187 | 290 | 187 | 290 | 187 | 290 | 187 | 251 | 187 | 251 | 187 | 251 |
| Heating temperature in heat treatment step [° C.] | 80 | | 110 | | 170 | | 80 | | 110 | | 170 | |
| Boiling point of water-soluble solvent in first ink—heating temperature [° C.] | 107 | | 77 | | 17 | | 107 | | 77 | | 17 | |
| Boiling point of water-soluble solvent in second ink—boiling point of water-soluble solvent in first ink [° C.] | 103 | | 103 | | 103 | | 64 | | 64 | | 64 | |
| Application amount of pigment contained in second ink [g/m²] | 1.4 | | 1.4 | | 1.4 | | 1.4 | | 1.4 | | 1.4 | |
| Fixation of first ink | A | | A | | A | | A | | A | | A | |
| Scratch resistance of second ink image | A | | A | | A | | A | | A | | A | |
| Color density of second ink image (OD value) | 1.27 | | 1.25 | | 1.30 | | 1.15 | | 1.14 | | 1.16 | |
| Cracking resistance of second ink image | C | | C | | C | | A | | A | | A | |

TABLE 7

|  | Example 22 | | Example 23 | | Example 24 | | Example 25 | | Example 26 | | Example 27 | |
| --- | --- | --- | --- | --- | --- | --- | --- | --- | --- | --- | --- | --- |
|  | First W-1 | Second Bk-1 | First W-1 | Second Bk-1 | First W-1 | Second Bk-1 | First W-1 | Second C-1 | First W-1 | Second C-1 | First W-1 | Second C-1 |
| Resin glass transition point Tg [° C.] | −30 | 32 | −30 | 32 | −30 | 32 | −30 | 32 | −30 | 32 | −30 | 32 |
| Solvent boiling point [° C.] | 187 | 290 | 187 | 290 | 187 | 290 | 187 | 290 | 187 | 290 | 187 | 290 |
| Heating temperature in heat treatment step [° C.] | 80 | | 110 | | 170 | | 80 | | 110 | | 170 | |
| Boiling point of water-soluble solvent in first ink—heating temperature [° C.] | 107 | | 77 | | 17 | | 107 | | 77 | | 17 | |

TABLE 7-continued

|  | Example 22 | | Example 23 | | Example 24 | | Example 25 | | Example 26 | | Example 27 | |
| --- | --- | --- | --- | --- | --- | --- | --- | --- | --- | --- | --- | --- |
|  | First W-1 | Second Bk-1 | First W-1 | Second Bk-1 | First W-1 | Second Bk-1 | First W-1 | Second C-1 | First W-1 | Second C-1 | First W-1 | Second C-1 |
| Boiling point of water-soluble solvent in second ink—boiling point of water-soluble solvent in first ink [° C.] | 103 | | 103 | | 103 | | 103 | | 103 | | 103 | |
| Application amount of pigment contained in second ink [g/m²] | 1.6 | | 1.6 | | 1.6 | | 1.4 | | 1.4 | | 1.4 | |
| Fixation of first ink | A | | A | | A | | A | | A | | A | |
| Scratch resistance of second ink image | A | | A | | A | | A | | A | | A | |
| Color density of second ink image (OD value) | 1.41 | | 1.39 | | 1.40 | | 1.20 | | 1.21 | | 1.18 | |
| Cracking resistance of second ink image | B | | B | | B | | A | | A | | A | |

TABLE 8

|  | Example 28 | | Example 29 | | Example 30 | | Example 31 | | Example 32 | | Example 33 | |
| --- | --- | --- | --- | --- | --- | --- | --- | --- | --- | --- | --- | --- |
|  | First W-1 | Second M-1 | First W-1 | Second M-1 | First W-1 | Second M-1 | First W-1 | Second Y-1 | First W-1 | Second Y-1 | First W-1 | Second Y-1 |
| Resin glass transition point Tg [° C.] | −30 | 32 | −30 | 32 | −30 | 32 | −30 | 32 | −30 | 32 | −30 | 32 |
| Solvent boiling point [° C.] | 187 | 290 | 187 | 290 | 187 | 290 | 187 | 290 | 187 | 290 | 187 | 290 |
| Heating temperature in heat treatment step [° C.] | 80 | | 110 | | 170 | | 80 | | 110 | | 170 | |
| Boiling point of water-soluble solvent in first ink—heating temperature [° C.] | 107 | | 77 | | 17 | | 107 | | 77 | | 17 | |
| Boiling point of water-soluble solvent in second ink—boiling point of water-soluble solvent in first ink [° C.] | 103 | | 103 | | 103 | | 103 | | 103 | | 103 | |
| Application amount of pigment contained in second ink [g/m²] | 1.4 | | 1.4 | | 1.4 | | 1.4 | | 1.4 | | 1.4 | |
| Fixation of first ink | A | | A | | A | | A | | A | | A | |
| Scratch resistance of second ink image | A | | A | | A | | A | | A | | A | |
| Color density of second ink image (OD value) | 1.08 | | 1.08 | | 1.09 | | 0.95 | | 0.92 | | 0.91 | |
| Cracking resistance of second ink image | A | | A | | A | | A | | A | | A | |

In each of Examples 1 to 33, in which the glass transition point of the water-dispersible resin contained in the first ink was less than −5° C., and the glass transition point of the water-dispersible resin contained in the second ink was from −5° C. to 35° C., the fixation of the first ink and the scratch resistance of the second ink image were favorable, and cracking of the second ink image was also suppressed.

In contrast, none of Comparative Examples 1 to 9 was able to exhibit satisfactory results for all of the first ink fixation, the scratch resistance of the second ink image, and the cracking resistance of the second ink image. In Comparative Examples 1 to 3, in which an ink containing a water-dispersible resin having a glass transition point of −5° C. or higher was printed, but a lower layer of an ink containing a water-dispersible resin having a lower glass transition point was not formed, the white ink fixation was inferior. In Comparative Examples 4 to 6, in which the glass transition point of the ink of the upper layer was less than −5° C., the scratch resistance of the image was inferior. In Comparative Examples 7 to 9, in which the glass transition point of the ink of the upper layer exceeded 35° C., the cracking resistance of the image was inferior.

According to embodiments of the present invention, it is possible to provide an aqueous inkjet ink set for textile printing with which, when two or more inks are printed in such a manner that one ink is printed and another ink is printed thereon, using a textile inkjet printing method, an image that exhibits excellent scratch resistance and cracking resistance for the ink image of the upper layer, and excellent fixation of the ink of the lower layer to the substrate, may be formed, and it is also possible to provide a method for producing a printed textile item.

The present invention includes the following embodiments. However, the present invention is not limited to the following embodiments.

<1> An aqueous inkjet ink set for textile printing comprising:

a first ink containing a water-dispersible resin having a glass transition point of less than −5° C., a coloring material and water, and a second ink containing a water-dispersible resin having a glass transition point of from −5° C. to 35° C., a coloring material and water.

<2> The aqueous inkjet ink set for textile printing according to <1>, wherein the first ink further contains a water-soluble solvent having a boiling point of 230° C. or lower.

<3> The aqueous inkjet ink set for textile printing according to <1> or <2>, wherein the second ink further contains a water-soluble solvent having a boiling point of 260° C. or higher.

<4> The aqueous inkjet ink set for textile printing according to any one of <1> to <3>, wherein the first ink and the second ink each independently contain a water-soluble solvent, and the boiling point of the water-soluble solvent contained in the second ink is at least 60° C. higher than the boiling point of the water-soluble solvent contained in the first ink.

<5> The aqueous inkjet ink set for textile printing according to any one of <1> to <4>, wherein the first ink contains a white coloring material, and the second ink contains a non-white coloring material.

<6> The aqueous inkjet ink set for textile printing according to any one of <1> to <4>, comprising a plurality of the second ink.

<7> A method for producing a printed textile item using the aqueous inkjet ink set for textile printing according to any one of <1> to <6>, the method comprising:

applying the first ink to a substrate using an inkjet recording method, and applying the second ink, using an inkjet recording method, to at least a portion of the region of the substrate to which the first ink has been applied.

<8> The method for producing a printed textile item according to <7>, further comprising heating the substrate following the application of the second ink.

<9> The method for producing a printed textile item according to <8>, wherein the first ink contains a water-soluble solvent, and the heating temperature during the healing is lower than the boiling point of the water-soluble solvent contained in the first ink.

<10> The method for producing a printed textile item according to <9>, wherein the difference between the heating temperature during the heating and the boiling point of the water-soluble solvent contained in the first ink is not more than 120° C.

<11> The method for producing a printed textile item according to any one of <7> to <10>, wherein the amount applied of the second ink, reported as an amount applied of the coloring material contained in the second ink, is 1.4 g/m² or less.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An aqueous inkjet ink set for textile printing comprising:

a first ink containing a water-dispersible resin having a glass transition point of less than −5° C., a coloring material and water, and a second ink containing a water-dispersible resin having a glass transition point of from −5° C. to 35° C., a coloring material and water, wherein the second ink further contains a water-soluble solvent having a boiling point of 280° C. or higher in an amount of from 10 to 80% by mass relative to the total mass of the second ink.

2. The aqueous inkjet ink set for textile printing according to claim 1, wherein the first ink further contains a water-soluble solvent having a boiling point of 230° C. or lower.

3. The aqueous inkjet ink set for textile printing according to claim 1, wherein the first ink and the second ink each independently contain a water-soluble solvent, and a boiling point of the water-soluble solvent contained in the second ink is at least 60° C. higher than a boiling point of the water-soluble solvent contained in the first ink.

4. The aqueous inkjet ink set for textile printing according to claim 1, wherein the first ink contains a white coloring material, and the second ink contains a non-white coloring material.

5. The aqueous inkjet ink set for textile printing according to claim 1, comprising a plurality of the second ink.

6. A method for producing a printed textile item using the aqueous inkjet ink set for textile printing according to claim 1, the method comprising:

applying the first ink to a substrate using an inkjet recording method, and applying the second ink, using an inkjet recording method, to at least a portion of a region of the substrate to which the first ink has been applied.

7. The method for producing a printed textile item according to claim 6, further comprising heating the substrate following the application of the second ink.

8. The method for producing a printed textile item according to claim 7, wherein the first ink contains a water-soluble solvent, and a heating temperature during the heating is lower than a boiling point of the water-soluble solvent contained in the first ink.

9. The method for producing a printed textile item according to claim 8, wherein a difference between the heating temperature during the heating and the boiling point of the water-soluble solvent contained in the first ink is not more than 120° C.

10. The method for producing a printed textile item according to claim 6, wherein an amount applied of the second ink, reported as an amount applied of the coloring material contained in the second ink, is 1.4 g/m² or less.

11. The aqueous inkjet ink set for textile printing according to claim 1, wherein the water-soluble solvent having a boiling point of 280° C. or higher contains glycerol, tetraethylene glycol, tetraethylene glycol monobutyl ether, or a mixture thereof.

12. The aqueous inkjet ink set for textile printing according to claim 1, wherein the water-soluble solvent having a boiling point of 280° C. or higher contains glycerol.

* * * * *